(12) United States Patent
Tsai

(10) Patent No.: US 7,111,999 B2
(45) Date of Patent: Sep. 26, 2006

(54) LENS HOLDER USED IN DIGITAL CAMERA

(75) Inventor: Ming-Chiang Tsai, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 106 days.

(21) Appl. No.: 10/823,350

(22) Filed: Apr. 12, 2004

(65) Prior Publication Data

US 2004/0202465 A1    Oct. 14, 2004

(30) Foreign Application Priority Data

Apr. 11, 2003  (TW) .............................. 92205666 U

(51) Int. Cl.
*G03B 17/12* (2006.01)
*G02B 7/02* (2006.01)

(52) U.S. Cl. .................. 396/529; 396/533; 348/374; 359/811; 359/829

(58) Field of Classification Search ................ 396/533, 396/529; 348/335, 373, 374; 359/808, 811, 359/821, 829
See application file for complete search history.

(56) References Cited

U.S. PATENT DOCUMENTS 4,187,534 A * 2/1980 Tichenor et al. ............ 362/268
5,214,533 A * 5/1993 Moracchini ................. 359/367
5,920,061 A * 7/1999 Feng ..................... 235/472.01
6,101,335 A   8/2000 Onda
6,172,822 B1 * 1/2001 Belliveau et al. ........... 359/819
2002/0065102 A1 * 5/2002 Miyake et al. .............. 455/556

FOREIGN PATENT DOCUMENTS

JP         61126513 A  *  6/1986
JP         62187808 A  *  8/1987

* cited by examiner

*Primary Examiner*—W. B. Perkey
*Assistant Examiner*—Rishi Suthar
(74) *Attorney, Agent, or Firm*—Wei Te Chung

(57) ABSTRACT

A lens holder (20) used in a digital camera includes a first housing (21) and a second housing (22) complementary thereto. Each housing includes a joining edge (203,204) and a plurality of screw threads (201,202) on an outside surface of the housings. A plurality of mounting holes (211) and a plurality of mounting pins (221) are formed on the joining edges of the housings. A plurality of partition platforms (213,223) is formed inside each housing to define a plurality of rooms for accommodating and securing a plurality of lenses. Each partition platform has a semi-circular opening (214,224) therethrough. In assembly, a plurality of lenses is inserted into the rooms and secured therein. Then, the second housing is assembled with the first housing with the locking pins inserting into the mounting holes of the joining edges. A lens holder used in a digital camera is thus formed.

10 Claims, 4 Drawing Sheets

LENS HOLDER USED IN DIGITAL CAMERA

BACKGROUND OF THE INVENTION

1. Field of the Invention

The present invention generally relates to digital cameras, and more particularly to a lens holder used in a digital camera.

2. Prior Art

Multifunctional portable personal communication devices, such as mobile phones with cameras, are very popular in current days, since they provide users not only with voice communications but also image communications, or can at least provide the users with picture-taking functions.

Existing mobile phones with digital cameras are classified into two types, according to the way the camera is assembled with the mobile phone. One type is a mobile phone with a build-in camera; the other is a mobile phone with an externally pluggable camera. Referring to FIG. 5, a lens holder 10 used in a digital camera built into a mobile phone (not shown) comprises a housing 11, a plurality of rubber cushions 13, and a top cover 14. The housing 11 is cylindrical in shape and is used to receive the plurality of rubber cushions 13 and a plurality of lenseses 12. Each rubber cushion 13 has an annular shape. In assembly, the plurality of rubber cushions 13 and the plurality of lenseses 12 are arranged in the housing 11 in an alternating fashion. Each two of the plurality of rubber cushions 13 defines a space therebetween for receiving one of the plurality of lenseses 12, and each rubber cushion 13 has a thickness that defines a desired distance between the lenses 12 to each of its sides. Finally, the top cover 14 is assembled with the housing 11 to secure the plurality of lenseses 12 therebetween.

However, during assembly, the plurality of lenses 12 and the plurality of rubber cushions 13 are alternately tightly fit in turn into the housing 11 through an opening thereof, which makes the assembly inconvenient. More seriously, the lenses 12 are prone to be tilt due to improper manipulation or due to the flexibility of the rubber cushions 13. As a result, the optical axes of the plurality of lenses 12 may become misaligned.

SUMMARY OF THE INVENTION

Accordingly, an object of the present invention is to provide a lens holder for use in a camera, in which the lens holder ensures that a plurality of lenses received therein will be optically aligned with each other with more accuracy.

Another object of the present invention is to provide a lens holder for use in a camera, in which the lens holder is easier to assemble and has a lower manufacturing cost.

To achieve the above-mentioned objects, a lens holder used in a digital camera comprises a first housing half and a second housing half complementary thereto. Each housing half comprises a top portion, a bottom portion, and a semi-cylindrical wall extending therebetween. Each housing half further comprises a joining edge and a plurality of screw threads on an outside surface of the wall. A plurality of mounting holes is defined in the joining edge of the first housing half, and a plurality of mounting pins protrudes from the joining edge of the second housing half. A plurality of partition platforms is formed inside each housing half to define a plurality of rooms for accommodating and securing a plurality of lenses. Each partition platform has a semi-circular opening therethrough. In assembly, the plurality of lenses is inserted into the rooms and secured therein. Then, the second housing half is assembled with the first housing half with the locking pins inserting into the mounting holes. A lens holder for use in a digital camera is thus formed.

DETAILED DESCRIPTION OF THE INVENTION

Figure 1:
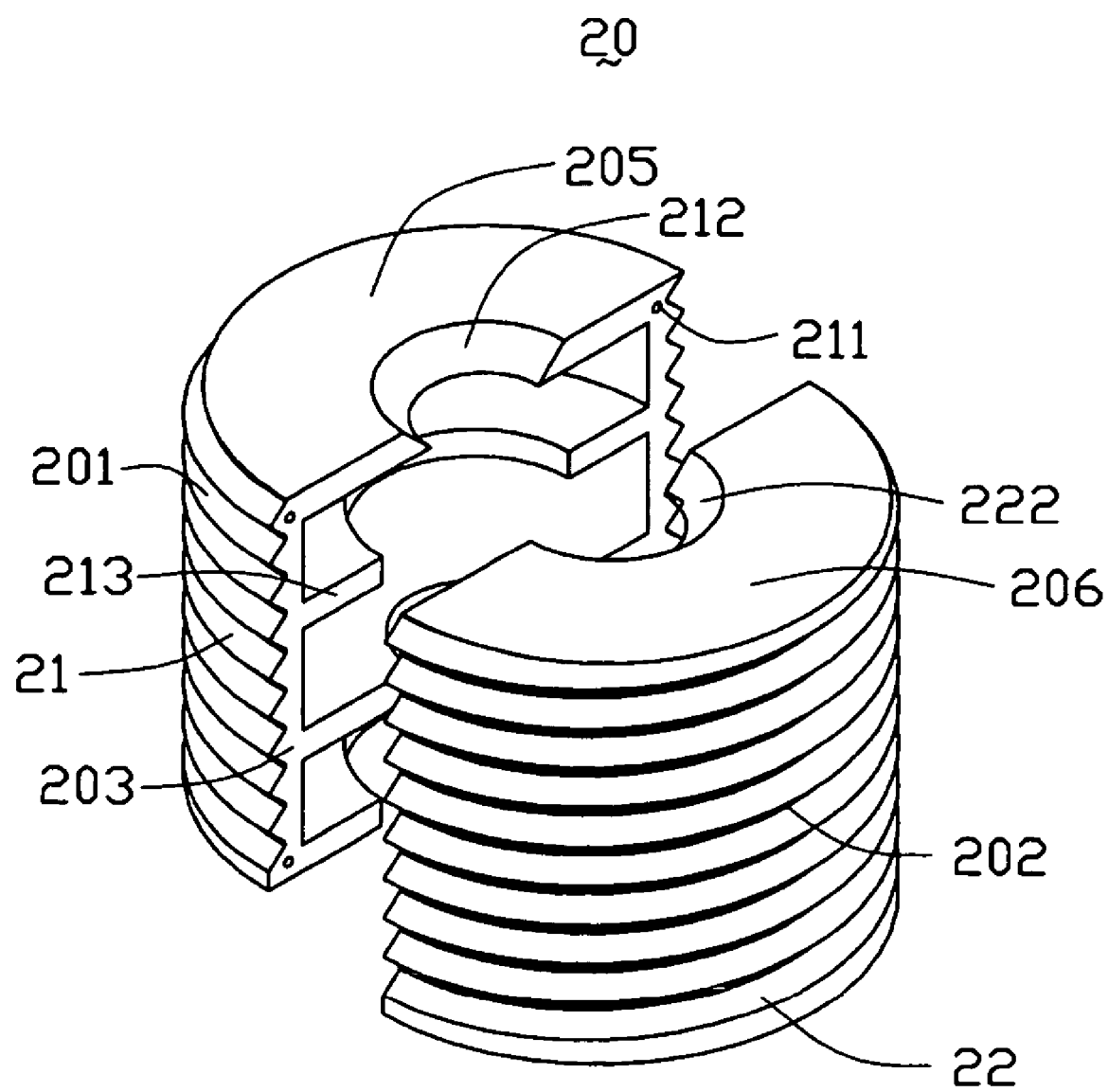
FIG. 1 is an exploded, perspective view of a lens holder used in a camera in accordance with a preferred embodiment of the present invention viewed from a first angle.
Figure 4:
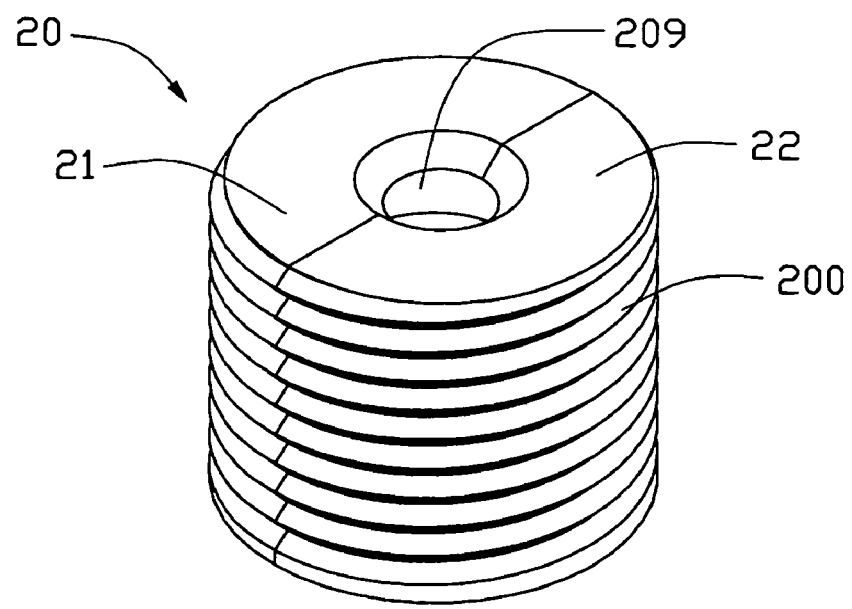
FIG. 4 is a perspective view of an assembled lens holder of FIG. 1 and a housing of the camera for engaging with the assembled lens holder.
Figure 4:
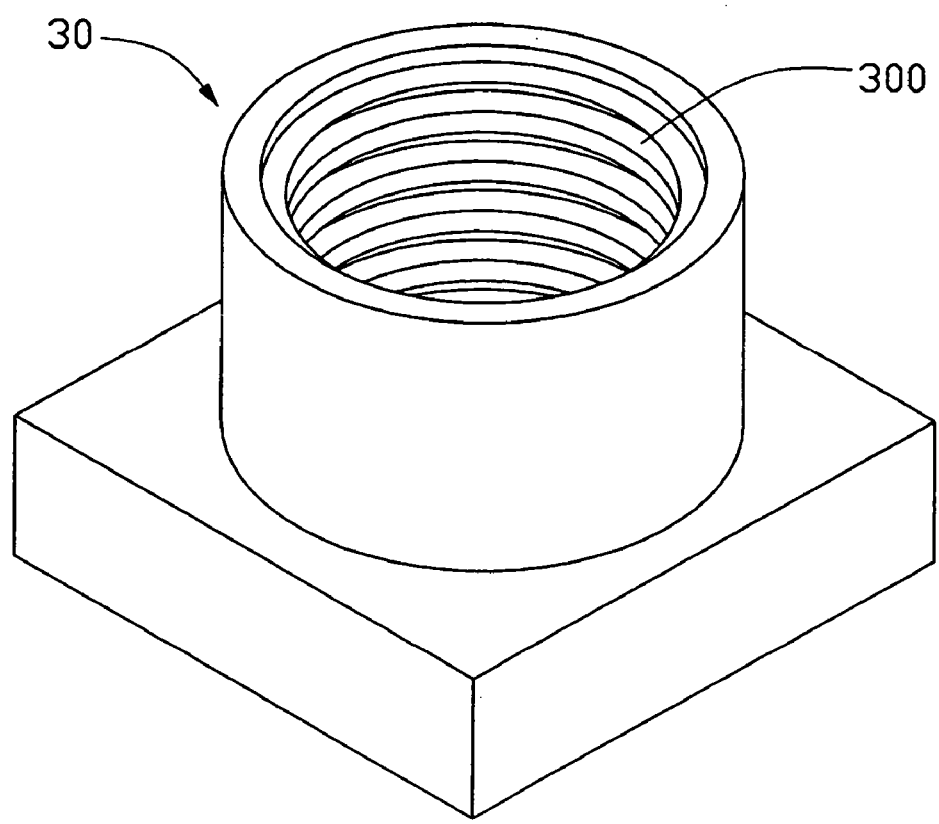
Figure 5:
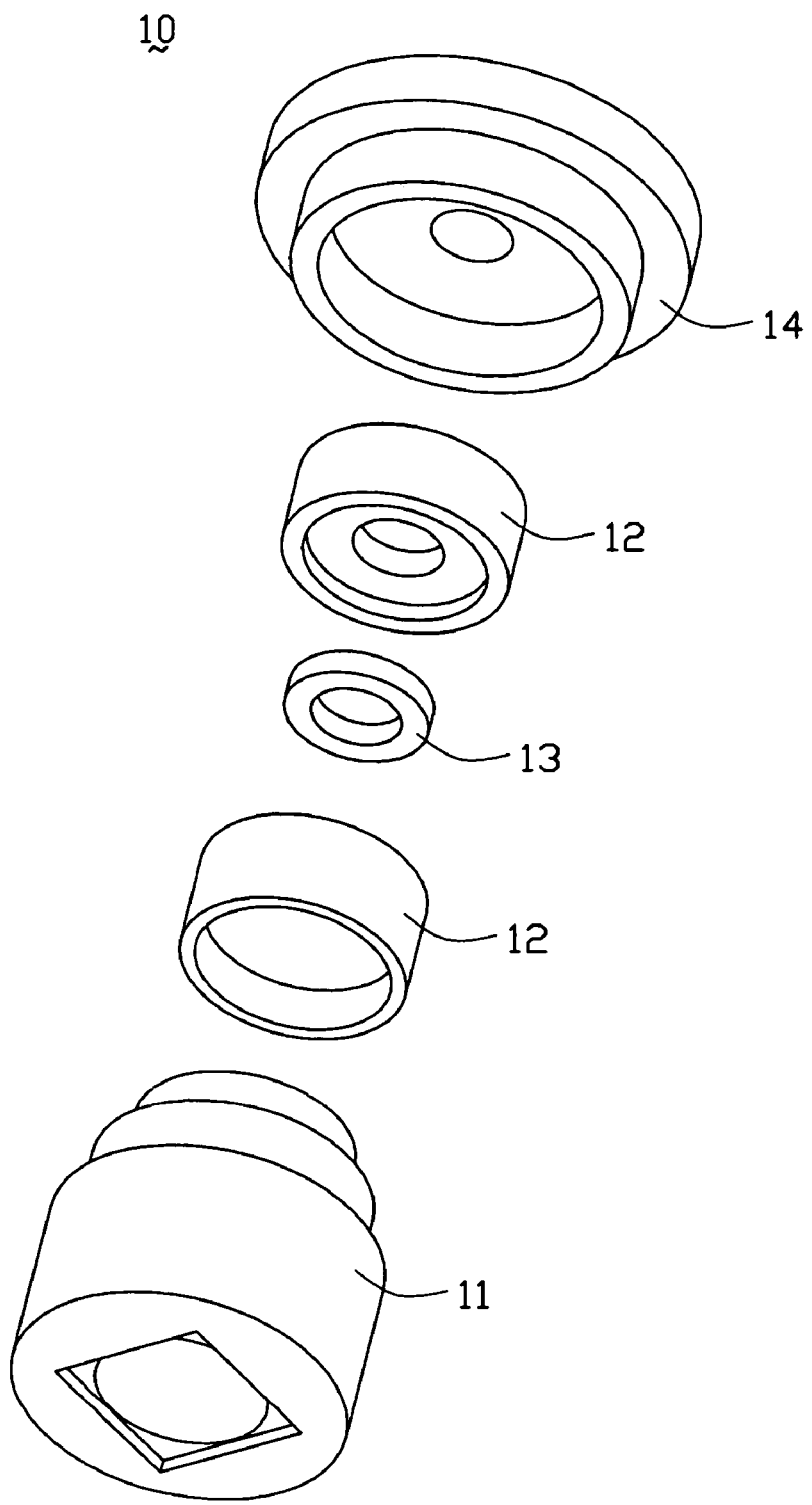
FIG. 5 is an exploded, perspective view of a lens holder and a plurality of lenses of the prior art.

Referring to FIGS. 1 and 4, a lens holder 20 according to a preferred embodiment of the present invention comprises a first housing half 21 and a second housing half 22. Each of the first housing half 21 and the second housing half 22 has a semi-cylindrical shape. The first housing half 21 and the second housing half 22 are symmetrical and complementary to each other. The first housing half 21 engages with the second housing half 22 to form the lens holder 20, as shown in FIG. 4.

Figure 2:
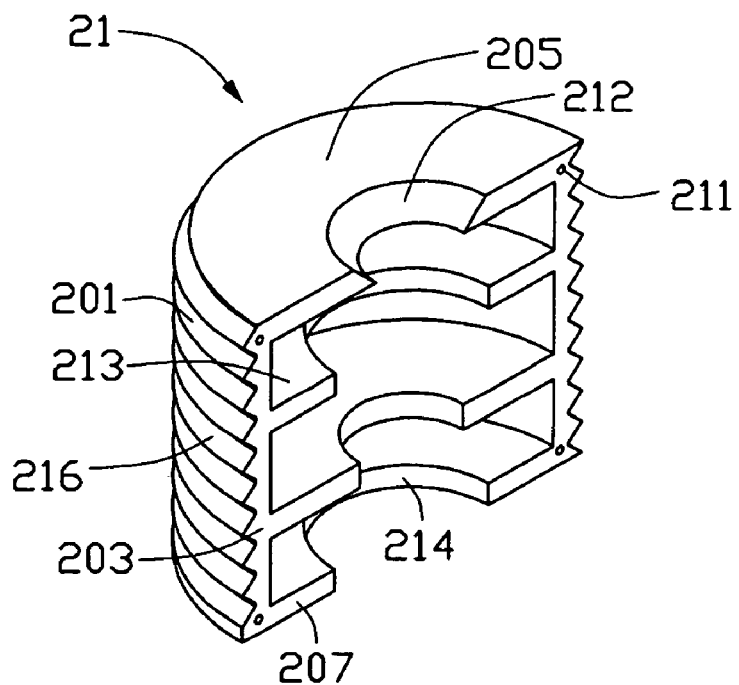
FIG. 2 is a perspective view of a first housing half of the lens holder of FIG. 1.

Referring to FIG. 2, the first housing half 21 comprises a top portion 205, a bottom portion 207, and a semi-cylindrical wall 216 extending therebetween. Both the top portion 205 and the bottom portion 207 are semi-circular. The top portion 205 has a semi-circular opening 212 defined therethrough. The opening 212 and the top portion 205 have the same radial center. The bottom portion 207 also has a semi-circular opening 214 which is aligned with the opening 212 of the top portion 205. The semi-cylindrical wall 216 has a plurality of screw threads 201 formed on an outward surface thereof.

The first housing half 21 further comprises a joining edge 203. A plurality of mounting holes 211 is defined in the joining edge 203. A plurality of partition platforms 213 is formed inside the first housing half 21 to define a plurality of rooms (not labeled) for accommodating and securing a plurality of lenses (not shown). In other words, the plurality of rooms is formed between the top portion 205, the partition platform 213, and the bottom portion 207. Each partition platform 213 has a semi-circular opening (not labeled) which is aligned and in communication with the opening 212 of the top portion 205 and the opening 214 of the bottom portion 207. The partition platforms 213 are integrally formed within the first housing half 21.

Figure 3:
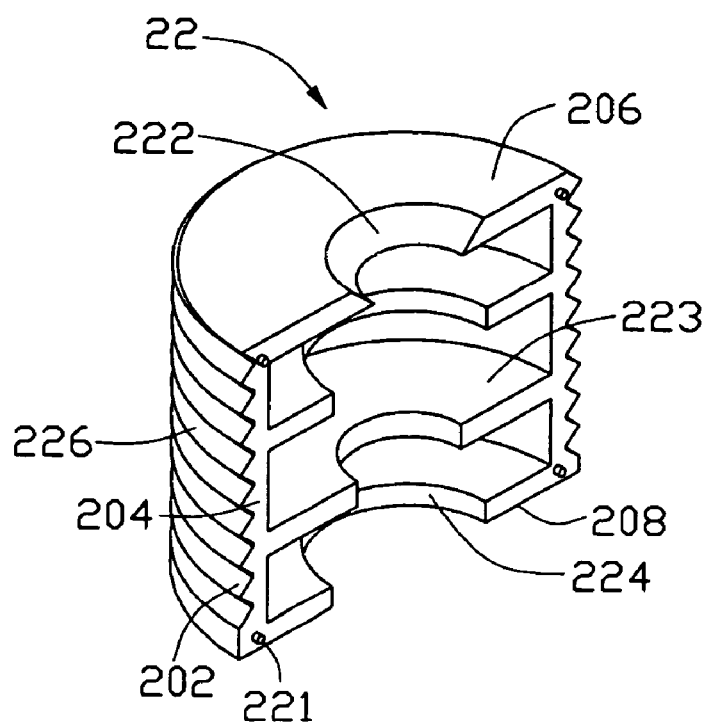
FIG. 3 is a perspective view of a second housing half of the lens holder of FIG. 1.

Referring to FIG. 3, the second housing half 22 comprises a top portion 206, a bottom portion 208, and a semi-cylindrical wall 226 extending therebetween. Both the top portion 206 and the bottom portion 208 are semi-circular. The top portion 206 has a semi-circular opening 222 defined therethrough. The opening 222 and the top portion 206 have the same radial center. The bottom portion 208 also has a semi-circular opening 224 which is aligned with the opening 222 of the top portion 206. The semi-cylindrical wall 226 has a plurality of screw threads 202 formed on an outside surface thereof.

The second housing half 22 further comprises a joining edge 204. A plurality of mounting pins 221 is formed on the joining edge 204. A plurality of partition platforms 223 is formed inside the second housing half 22 to define a plurality of rooms (not labeled) for accommodating and securing the plurality of lenses (not shown). In other words, the plurality of rooms is formed between the top portion 206, the partition platform 223, and the bottom portion 208. Each partition platform 223 has a semi-circular opening (not labeled) which is aligned and in communication with the opening 222 of the top portion 206 and the opening 224 of the bottom portion 208. The partition platform 223 are integrally formed within the second housing half 22.

Referring to FIG. 4, in assembly, a plurality of lenses (not shown) is inserted into the plurality of rooms defined by the plurality of the partition platforms 213, the top portion 205, and the bottom portion 207 of the first housing half 21. Then, the second housing half 22 is assembled with the first housing half 21, with the mounting pins 221 aligning with the mounting holes 211 in the joining edge 203 of the first housing half. When the mounting pins 221 are inserted into the mounting holes 211, the lens holder 20 with the lens mounted therein is thus completely assembled. As a result, a funnel-shaped opening 209 for passage of incident light, is formed by the opening 212 of the first housing half 21 in cooperation with the opening 222 of the second housing half 22. Likewise, a plurality of circular openings (not shown) inside the lens holder 20, including an opening (not shown) through the bottom of the lens holder 20 is formed, allowing passage of light signals therethrough, when the first housing half 21 is assembled with the second housing half 22.

Each semi-circular partition platform 213 combines with a corresponding semi-circular partition platform 223 to form a complete annular platform (not shown) with a circular opening (not shown) therethrough, when the first housing half 21 is assembled with the second housing half 22. The plurality of the annular platforms defines a plurality of cylindrically-shaped spaces for receiving and securing the plurality of lenses. The top portions 205 and 206 are assembled with each other to secure a lens in the lens holder 20. At this time, the screw threads 201 on the outside surface of the first housing half 21 join with the screw threads 202 on the outside surface of the second housing half 22 to form a complete set of screw threads 200. The screw threads 200 are used to mate with inner screw threads 300 formed in a fixture 30 in a mobile phone. The lens holder 20 is thus mounted within the fixture 30.

Compared with other lens holders in the prior art, mounting the plurality of lenses into the lens holder 20 is easier, since the lenses can be easily inserted into individual rooms defined by the plurality of partition platforms 213, the top portion 205, and the bottom portion 207 of the first housing half 21, and then the second housing half 22 can be assembled with the first housing half 21. In addition, the optical axes of the plurality of lenses are reliably aligned to a greater accuracy than the prior art, since the partition walls 213, together with the top portion 205, the bottom portion 207 take the place of the conventional rubber cushions to determine the spacing between each of the plurality of lenses. Moreover, the top portions 205 and 206 take the place of the top cover 14 in the prior art, so manufacturing cost is reduced.

Obvious variations of the above preferred embodiment includes, for example, the lens holder being comprised of three or more sectional housings, with the partition platforms each being formed inside one sectional housing.

It is believed that the present invention and its advantages will be understood from the foregoing description and it will be apparent that various changes may be made thereto without departing from the spirit and scope of the invention or sacrificing all of its material advantages, the examples hereinbefore described merely being preferred or exemplary embodiments of the invention.

I claim:

1. A lens assembly for use in a camera, comprising:
a lens holder comprising at least two joined partitions, each partition comprising at least one joining edge where the partition joins at least one adjacent partition, the at least two joined partitions cooperatively defining a cylindrical body of the lens holder, with a plurality of screw threads being provided on an outside surface of the body; and
a plurality of lenses received in the lens holder; wherein
at least one partition comprises one or more locking protrusions at the joining edge thereof, an adjacent partition correspondingly comprises one or more locking receptacles at the joining edge thereof, the locking protrusions are engagingly received in the locking receptacles to join the two partitions together, a plurality of partition platforms are formed inside at least one partition to define at least one room for accommodating and securing the plurality of lenses, and an opening is formed through each partition platform.

2. A lens holder for use in a camera, comprising:
a first housing half having a first plurality of partition platforms and a semi-cylindrical wall, a plurality of lacking pins protruding from the first housing half, a plurality of screw threads being formed on an outside surface of the wall of the first housing half; and
a second housing half being complementary to the first housing half, the second housing half having a second plurality of partition platforms and a semi-cylindrical wall, a plurality of locking holes being defined in the second housing half for engagingly receiving the locking pins, a plurality of screw threads being formed on an outside surface of the wall of the second housing half; wherein
when the first housing half is assembled with the second housing half to form a complete housing, the partition platforms of the first housing half and the partition platforms of the second housing half together define a plurality of rooms inside said complete housing for receiving a plurality of lenses and together define openings for passage of light.

3. The lens holder of claim 2, wherein each of the first housing half and the second housing half comprises a top portion and a bottom portion, the wall of each of the first housing half and the second housing half extends between the top and bottom portions, with the walls of the first housing half and the second housing half defining a joining edge where the first housing half adjoins the second housing half.

4. The lens holder of claim 3, wherein the top portion of each of the first housing half and the second housing half has a semi-circular opening therethrough, and the bottom portion of each of the first housing half and the second housing half has a semi-circular opening therethrough.

5. The lens holder of claim 4, wherein the semi-circular openings of the top portions of the first housing half and the second housing half cooperatively form a funnel-shaped opening through a top portion of said complete housing, and the semi-circular openings of the bottom portions of the first housing half and the second housing half cooperatively form a circular opening through a bottom portion of said complete housing.

6. The lens holder of claim 4, wherein each partition platform of each of the first housing half and the second housing half has a semi-circular opening which is aligned with the semi-circular openings through the top portion and the bottom portion.

7. A lens assembly comprising:
a lens holder defining a through hole along an axial direction thereof; and
a plurality of lenses axially spatially received in said lens holder to guide light passing through said through hole;
said lens holder including at least first and second parts assembled to each other, said first part defining at least one partition and defining at least one lateral opening exposed to an exterior before said second part is assembled to said first part, a plurality of screw threads being formed on an outside surface of each of said at least first and second parts to cooperatively form a set of screw threads of the lens holder; wherein at least one lens is inserted into a corresponding cavity derived from said at least one partition from the exterior through said lateral opening before said second part is assembled to said first part, and successively said lateral opening and said lens are hidden from the exterior after said second part is assembled to said first part.

8. The assembly of claim 7, wherein said first part and said second part are assembled in a lateral direction perpendicular to said axial direction.

9. The assembly of claim 7, wherein said first part and said second part are dimensioned and configured similar to each other.

10. The assembly of claim 7, wherein a plurality of mounting pins is formed on one of said at least first and second parts, and another of said at least first and second parts defines a plurality of mounting holes engagingly receiving the mounting pins.

* * * * *